United States Patent [19]
Custy et al.

[11] Patent Number: 6,088,684
[45] Date of Patent: *Jul. 11, 2000

[54] SECURE PRINTER FOR PRINTING FINANCIAL INSTRUMENTS

[75] Inventors: Jeanne M. Custy; Benjamin L. Knoll, both of Denver, Colo.

[73] Assignee: First Data Corporation, Omaha, Nebr.

[*] Notice: This patent is subject to a terminal disclaimer.

[21] Appl. No.: 09/106,490

[22] Filed: Jun. 29, 1998

Related U.S. Application Data

[63] Continuation of application No. 08/732,159, Oct. 16, 1996, Pat. No. 5,774,879, which is a continuation of application No. 08/173,907, Dec. 27, 1993, abandoned.

[51] Int. Cl.⁷ .................................................. G06F 157/00
[52] U.S. Cl. .............................................................. 705/35
[58] Field of Search ............................... 705/35; 395/110, 395/117, 186, 188.01, 218, 235, 491; 340/825.3, 825.31, 825.34; 235/379–383; 364/918.2; 713/200, 202

[56] References Cited

U.S. PATENT DOCUMENTS

| | | | |
|---|---|---|---|
| 2,071,141 | 2/1937 | Placke | 235/3 |
| 3,814,227 | 6/1974 | Hurd, III et al. | 197/1 |
| 3,848,798 | 11/1974 | Riley | 235/101 |
| 3,970,992 | 7/1976 | Boothroyd et al. | 340/172.5 |
| 3,984,660 | 10/1976 | Oka et al. | 235/61.7 |
| 3,997,763 | 12/1976 | Schasser | 235/61.9 |
| 4,025,905 | 5/1977 | Gorgens | 340/172.5 |
| 4,035,792 | 7/1977 | Price et al. | 340/277 |
| 4,053,735 | 10/1977 | Foudos | 235/61.9 |
| 4,082,945 | 4/1978 | van de Goor et al. | 235/419 |
| 4,114,027 | 9/1978 | Slater et al. | 235/419 |
| 4,175,694 | 11/1979 | Donabin | 235/475 |
| 4,195,353 | 3/1980 | Abe et al. | |
| 4,225,779 | 9/1980 | Sano et al. | 235/379 |
| 4,266,121 | 5/1981 | Hirose | 235/381 |
| 4,270,042 | 5/1981 | Case | 235/379 |
| 4,317,028 | 2/1982 | Simjian | 235/380 |
| 4,321,671 | 3/1982 | Ohsako | 364/405 |
| 4,328,544 | 5/1982 | Baldwin et al. | 364/405 |
| 4,341,951 | 7/1982 | Benton | 235/379 |
| 4,355,369 | 10/1982 | Garvin | 364/900 |
| 4,385,285 | 5/1983 | Horst et al. | 382/3 |
| 4,417,137 | 11/1983 | Lundblad | 235/379 |
| 4,494,127 | 1/1985 | King | 346/82 |
| 4,523,330 | 6/1985 | Cain | 382/7 |
| 4,541,334 | 9/1985 | Liedtke et al. | |
| 4,572,946 | 2/1986 | Schrenk | 235/380 |
| 4,589,069 | 5/1986 | Endo et al. | 364/405 |
| 4,611,286 | 9/1986 | Nishimura et al. | 364/405 |

(List continued on next page.)

OTHER PUBLICATIONS

"Systems Center Announces Print Spooler for Multi-Vendor Unix Networks", News Release, Oct. 30, 1991, Dialog firl 621, Accession No. 00313641.

"Intuit Enters Windows Market With Quicken for Windows", News Release, Menlo park, Ca, Oct. 21, 1991, Dialog file 621, Accession No. 00319521.

"Create a Check: Create–A–Check system saves time and money; Corporate solution provides added security and flexibility", Dec. 21, 1993, Dialog file 610, Accession No. 0375837.

(List continued on next page.)

*Primary Examiner*—Frantzy Poinvil
*Attorney, Agent, or Firm*—Sidley & Austin

[57] ABSTRACT

An integrated data processing system having an execution control processor (10) that itself comprises a security processor (12) and data base processor (14). Bidirectional communication with a printer (30) is provided through a print processor (28) to provide for the secure printing of financial instruments. Grammar files (24) and parameter files (26) are supplied to allow for the configuration and customization of the execution control processor (10) and a graphical user interface (18). A communications processor (20) is provided to establish network connection with a host computer. Context-sensitive help is provided using a help processor (22).

17 Claims, 8 Drawing Sheets

U.S. PATENT DOCUMENTS

| | | | |
|---|---|---|---|
| 4,624,588 | 11/1986 | Bivin | 400/105 |
| 4,625,275 | 11/1986 | Smith | 364/401 |
| 4,630,200 | 12/1986 | Ohmae et al. | 364/405 |
| 4,630,201 | 12/1986 | White | 364/408 |
| 4,637,051 | 1/1987 | Clark | 382/1 |
| 4,641,346 | 2/1987 | Clark et al. | 380/3 |
| 4,641,347 | 2/1987 | Clark et al. | 380/3 |
| 4,699,532 | 10/1987 | Smith | 400/104 |
| 4,727,243 | 2/1988 | Savar | 235/379 |
| 4,731,735 | 3/1988 | Borgendale et al. | |
| 4,745,602 | 5/1988 | Morrel | 371/20 |
| 4,804,825 | 2/1989 | Bitoh | 235/380 |
| 4,812,986 | 3/1989 | Smith | 364/479 |
| 4,870,596 | 9/1989 | Smith | 364/479 |
| 4,884,199 | 11/1989 | Boothroyd et al. | 364/408 |
| 4,894,784 | 1/1990 | Smith | 364/479 |
| 4,910,696 | 3/1990 | Grossman et al. | |
| 4,921,279 | 5/1990 | Hanna | |
| 4,980,518 | 12/1990 | Kobayashi et al. | |
| 4,991,983 | 2/1991 | Graverholt | |
| 5,014,212 | 5/1991 | Smith | 364/479 |
| 5,021,967 | 6/1991 | Smith | 364/479 |
| 5,053,606 | 10/1991 | Kimizu | 235/379 |
| 5,060,153 | 10/1991 | Nakaagawa | 364/405 |
| 5,119,293 | 6/1992 | Hamond | 364/401 |
| 5,155,842 | 10/1992 | Rubin | 395/575 |
| 5,247,623 | 9/1993 | Sun | 395/325 |
| 5,307,265 | 4/1994 | Winans | 364/419.01 |
| 5,337,122 | 8/1994 | Hubble, III et al. | |
| 5,347,302 | 9/1994 | Simonoff | |
| 5,774,879 | 6/1998 | Custy et al. | 705/35 |

OTHER PUBLICATIONS

"New Version of Impact Award Accounting Software Features Fast Dot–Key Capability Between Menus and Program Modules", News Releas, Las Vegas, NV Oct. 21, 1991, Dialog file 621, Accession No. 00311352.

Tucker, Tracey, "Chase Global Disbursement System Uses PC Platform", *American Banker*, Aug. 23, 1994, p. 12.

"Software Name: Peachtree Accounting for Windows, Version: 5.0", *Peachtree Software, Inc.*, 1992, dialog File 237, Acession No. 00015320.

"Systems Union Automates European Community Accounting Changes to Help Users Easily Comply With New Regulations", *News Release*, White Plans, NY, Mar. 15, 1993, Dialog File 621, Accession No. 00353591.

"Mac Leader Layered Announce Personal Finance Manager for Windows, Supported by Asymetrix' ToolBook", *News Release*, New York, NY, May 21, 1990, Dialog File 621, Accession No. 00261454.

"Eclipse Corporation Formsplus/400 Forms Software", *News Release*, Atlanta, GA, Jun. 1, 1993, Dialog File 621, Accession No. 00359277.

Gochenouer, "Accounts Payable Goes High Tech: Laser Check Printers", Oct. 1990, *CPA, The Journal*.

Mastering Windows™ 3–1, 1992, Library of Congress Card No. 91–68096, pp. 193–197, 902–903.

"Text Search Examiner Training Manual for Automated Patent System (APS)," Nov. 30, 1990, pp. 1–2, A–2, A–3.

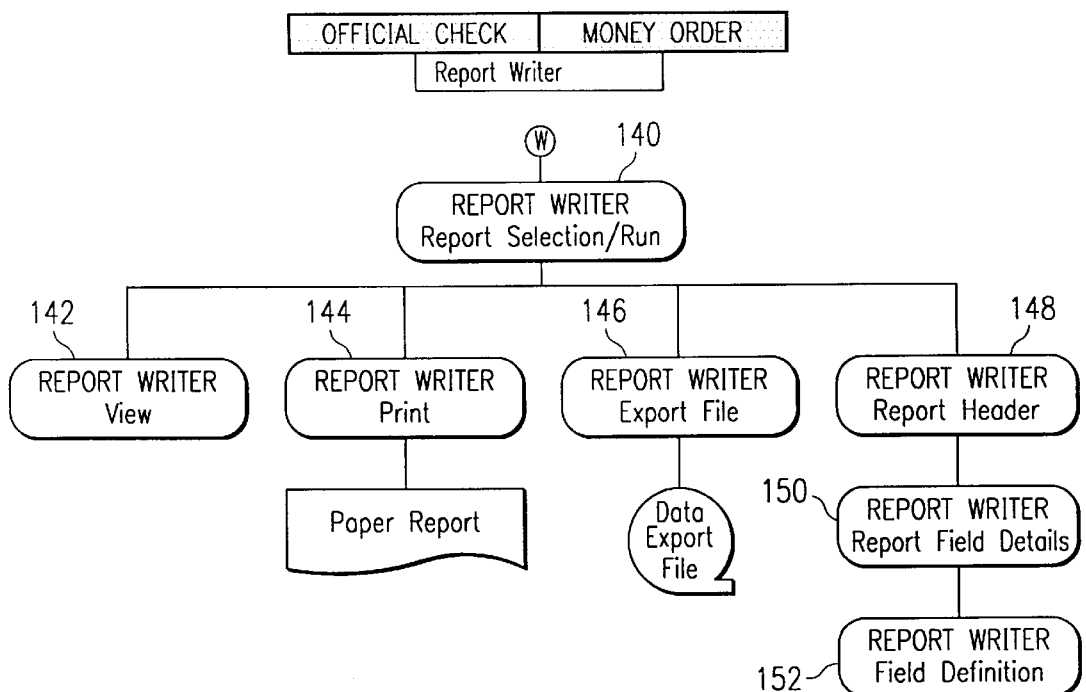
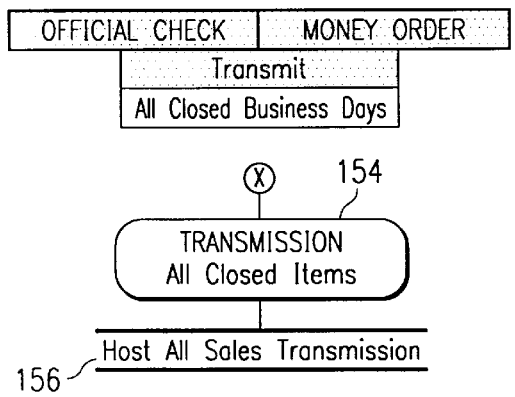
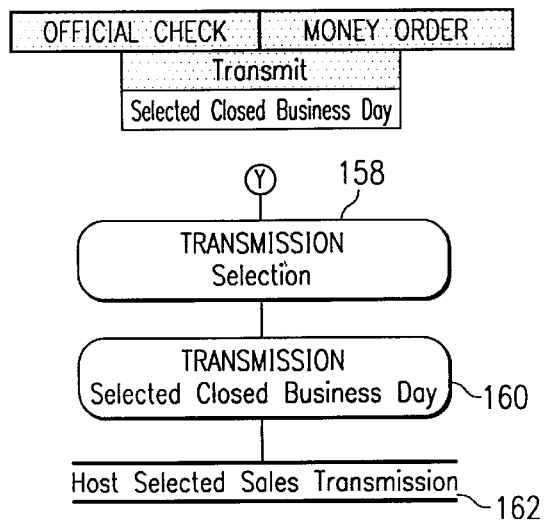
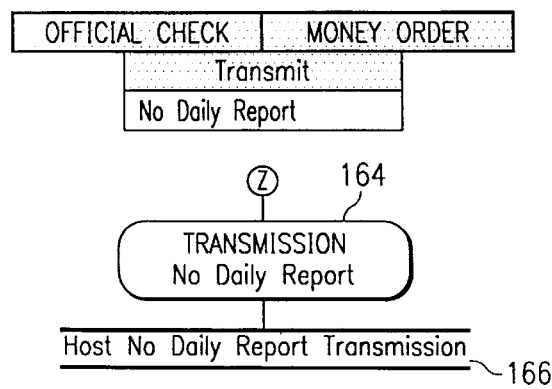

FIG. 23
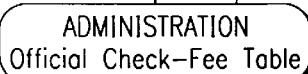
FIG. 24
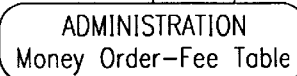
FIG. 25
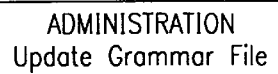
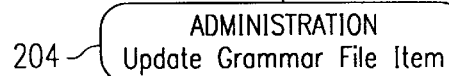
FIG. 26
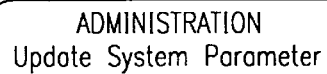
FIG. 27
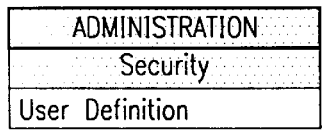
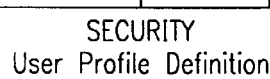
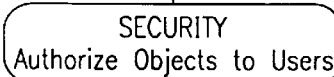
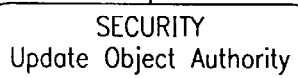
FIG. 28
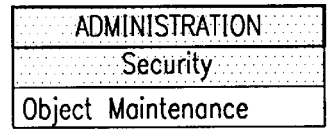
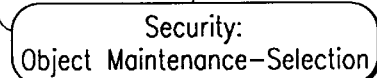
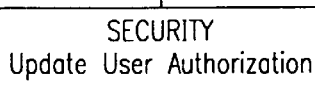
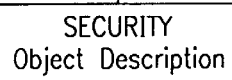

SECURE PRINTER FOR PRINTING FINANCIAL INSTRUMENTS

RELATED APPLICATIONS

This application is a continuation patent application of prior pending U.S. application Ser. No. 08/732,159 now U.S. Pat. No. 5,774,879 filed Oct. 16, 1996, which is a continuation of U.S. patent application Ser. No. 08/173,907 filed Dec. 27, 1993 now abandoned.

TECHNICAL FIELD OF THE INVENTION

This invention relates in general to data processing systems and more particularly to an improved automated financial instrument processing system and method of operation.

BACKGROUND OF THE INVENTION

Automated systems for printing and delivering money orders have been developed and used in the past with some measure of success by both financial institutions and retail outlets. These systems provide the basic systems and methods of providing the transaction data to a printer which holds blank financial instruments such as money orders. The blank money orders are stored in the printer in a secure fashion to prevent fraudulent creation of money orders. The presence of blank money orders in the printer makes the system very vulnerable to the fraudulent creation of money orders and to mistakes in the creation of money orders such as the creation of duplicate money orders due to printer malfunctions, user data entry errors or other system malfunctions.

The systems that have been developed for creating and delivering money orders in the past have been systems with dedicated hardware and little, if any, interface with other systems such as general accounting systems, other data processing facilities or back-up and recovery facilities. Integration of the delivery and creation of financial instruments is necessary to provide adequate security for these facilities and to allow for communication of these subsystems with supervisory systems such as host accounting systems.

SUMMARY OF THE INVENTION

Accordingly, a need has arisen for an integrated financial instrument processing system that is generally portable to a variety of platforms and hardware architectures and provides adequate security during the creation and delivery of financial instruments. In accordance with the teachings of the present invention, an integrated financial instrument processing system is provided that substantially reduces disadvantages associated with prior art systems and methods of operation.

According to one embodiment of the present invention, a financial instrument processing system is provided that comprises a graphical user interface that is operable to communicate with a data base processing system. The graphical user interface and data base processing systems are monitored by a security processor which provides security for the system on a user-by-user and object-by-object basis. A printer is coupled to the print processing system and is operable to print financial instruments using information sent from the execution control processor. The print processor monitors printer messages and communicates with the security processing system to prevent unauthorized access to the printer. After receiving verification that the financial instrument has printed, the print processor passes transaction information to the data base processor. The information is then written to the transaction file.

According to another embodiment of the present invention, a communications processor is included and is operable to communicate with the data base processing system to provide information stored in the data base processing system to other systems such as host accounting systems.

According to an alternate embodiment of the present invention, a grammar file is provided that is operable to revise constants in the graphical user interface on a user-by-user basis. A parameter file is also provided to configure the general operation of the financial instrument processing system.

According to an alternate embodiment of the present invention, the software system of the present invention serves as an open platform to allow for the integration and processing of other financial applications or products. For example, the modular nature of the system of the present invention allows for the efficient integration and management of other products such as money grams, starter checks, variable amount coupons, gift checks or gift certificates, cashier checks, insta-pay functions, phone cards and the like. In addition, the modular nature of the system of the present invention allows it to be integrated with other teller applications. For example, the functions of the present system can be accessed through an alternate working environment that would replace the graphical user interface of the present invention.

BRIEF DESCRIPTION OF THE DRAWINGS

A more complete understanding of the present invention may be acquired by referring to the accompanying FIGUREs in which like reference numbers indicate like features and wherein:

FIGS. 2 through 28 comprise menu and flow chart representations of the financial instrument processing method of the present invention.

DETAILED DESCRIPTION OF THE INVENTION

Figure 1:
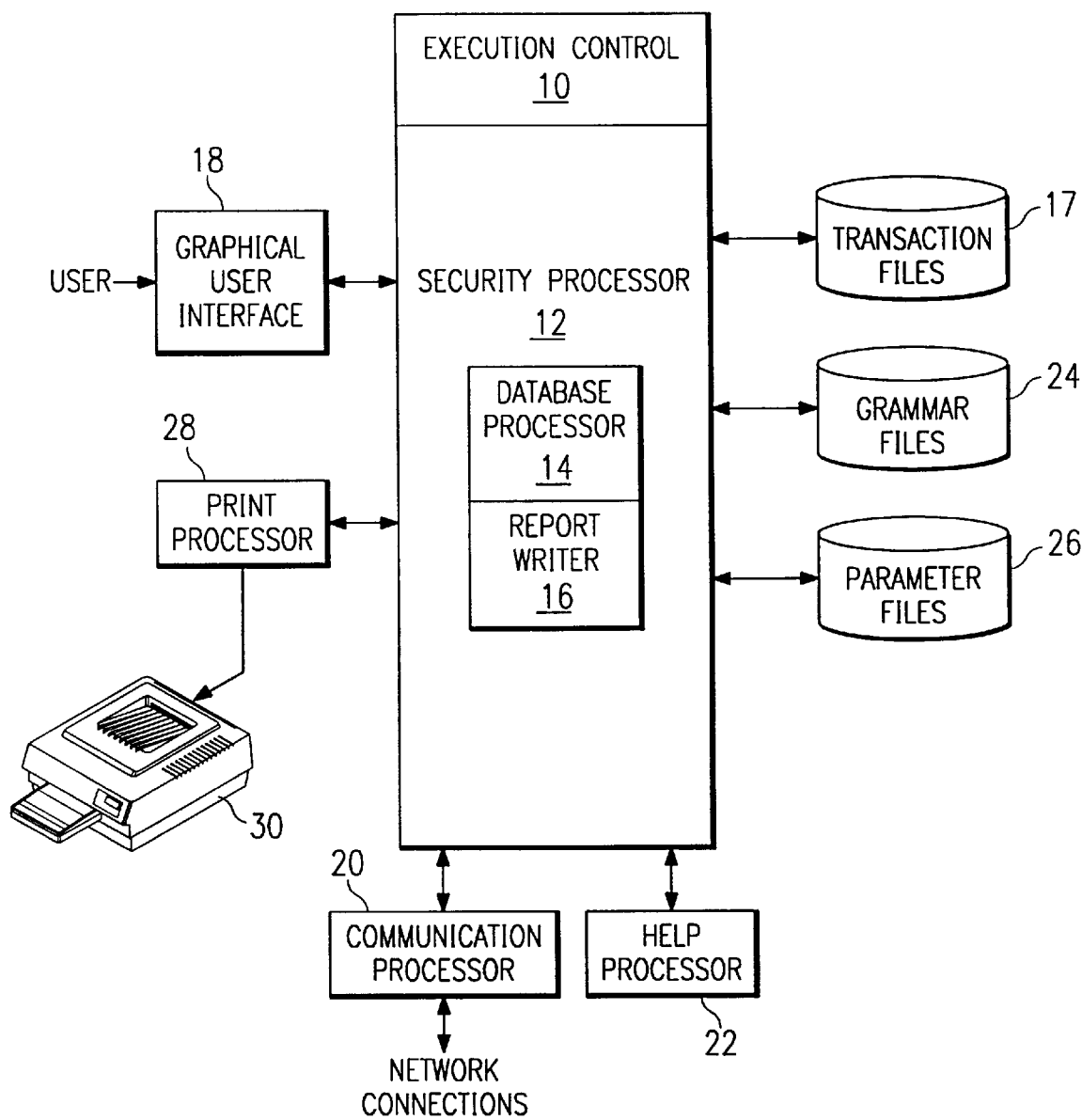
FIG. 1 is a schematic block diagram of the financial instrument processing system constructed according to the teachings of the present invention.

The financial instrument processing system of the present invention comprises an object-oriented software system that is highly portable between various hardware platforms. The architecture of the integrated software system is constructed such that the system can be easily and conveniently ported to a variety of operating systems such as MS DOS, Windows, OS2, or UNIX. In addition, the system of the present invention is highly adaptable to network environments such as local area networks, wide area networks, mini-LANs and the like where the various components can be resident in physically separated servers. The architecture of the present invention is illustrated in FIG. 1 and comprises an execution control processor 10 which itself comprises a security processor 12 and a data base processor 14. The data base processor also comprises a report writer 16 and accesses data stored in transaction files 17. It should be understood that the term processor used herein refers to a software module operating to perform a particular task or group of tasks. A single such module may actually be running on a variety of hardware architectures which could include single or multiple hardware processors.

The data base processor 14 manages an ASCII flat file data base which uses relative record key accesses to provide for efficient storage and maintenance of the data used by the integrated system. The ASCII files are stored in transaction files 17 and accessed as necessary by the data base processor 16. In one embodiment of the present invention, ASCII flat files are used to maintain portability between various platforms and their operating systems. ASCII flat files are accepted without compatibility concerns by virtually all hardware platforms. According to alternate embodiments of the present invention, other more sophisticated data base systems may be used such as SYBASE or ORACLE provided that a particular hardware platform and operating environment to be used is compatible with such data base systems. More sophisticated data base products provide for intrinsic journaling, intrinsic mirroring and intrinsic data base recovery which may be advantageously used in the architecture of the present invention.

The data base processor 14 records the transactions performed by the integrated system in a largely chronological order, including audit information such as a teller performing the transaction, and the date and time of the transaction. The relative record key access system used by the data base processor 14 allows for an access to be performed within the data base processor 14 by jumping to the date of the transaction or record desired and then providing sequential access through the group of records associated with that date. In order to provide for the fastest access, the records are accessed within the date in reverse chronological order. This access method is used because, on average, the more recent records are the records that will be manipulated more frequently.

The data base processor 14 also communicates with a report writer 16 to allow for the compilation and output of report information in various formats such as data files, printed reports, and report inquiries.

The security processor 12 provides both user-level and object-level security. An object for the integrated system may comprise, for example, a particular file, reports created by the report writer 16, or a particular program or menu item. Under multi-processing platforms such as UNIX-based platforms, the security processor 12 may comprise an independent process such as a terminate and stay resident (TSR) program which functions to monitor the processing and accesses of all the remaining processes. Under single process platforms, such as MS DOS, the security processor 12 may be constructed within each object to monitor access to that object. Particular security routines relative to particular objects will be discussed more fully herein. In general, however, the security processor 12 provides for multi-level user and object-based security for the integrated system. For example, the security processor 12 provides for supervisory and general user security access to various objects. The security processor 12 interfaces directly with a graphical user interface 18 to monitor attempted accesses to various objects within the integrated system made by users of the graphical user interface 18.

The graphical user interface 18 may provide, for example, a mouse-driven or keyboard-driven user interface to allow for the efficient navigation of the various objects and capabilities of the integrated system. The graphical user interface 18 begins with a main application menu which allows the user to select a variety of capabilities of the system. The operation of the integrated system and the objects that are constructed to perform the various functions of the integrated system can be best understood by examining the menus and flow charts associated with the particular objects which will be described in more complete detail in FIGS. 2 through 28 herein. In general, however, the graphical user interface 18 interfaces with the security processor 12 in order to present the user with the appropriate options for that user's security level. Further, the security processor 12 requires entry of a password or other security measures before the integrated system is allowed to progress through a particular object.

The execution control processor 10 is also coupled to a communications processor 20. The communications processor 20 allows the integrated system to communicate with other systems through network connections. According to one embodiment of the present invention, the communications processor 20 allows for communication with an integrated communications platform system to allow for session-based communications with a host computer. The operation of such a communications platform is fully described in U.S. patent application Ser. No. 08/130,297 entitled "INTEGRATED COMMUNICATIONS PLATFORM" filed Oct. 1, 1993, now abandoned and assigned to the Assignee of the present application, the disclosure of which is hereby incorporated by reference into the present description as if set forth fully herein. The integrated system of the present invention allows the user to perform a variety of transactions which are logged in the data base of information managed by data base processor 14. Periodically, these transactions may be uploaded to a host computer or super server through the communications processor 20. In addition, a variety of maintenance and supervisory operations may be performed on the integrated system from a remote location using the communications processor 20. In this manner, the integrated system is remotely programmable and configurable. The communications processor 20 is constructed in such a manner to allow for the efficient communication with conventional modem-based communication or dedicated high speed data links. The communications processor 20 acts as an interface between the integrated system and whatever communication facilities are available via network connections. The communications processor 20 is independent of the communication facility such that the operation of the integrated system is not changed or affected depending on what sort of communication facilities are available to a particular implementation of the integrated system.

The execution control processor 10 is also coupled to a help processor 22 which provides chapter-sensitive help to a user of the integrated system. According to one embodiment of the present invention, the help file is chapter-sensitive in that the integrated system provides the appropriate chapter of a help file depending upon where the user is during the navigation of the integrated system. Chapter-sensitive help is a fast way of providing help that allows for easy adaption of the help file to a particular implementation. The help file is a text file which can be edited from within the execution control processor 10 to provide for specific help information for particular implementations. For example, the help file can be edited to provide names and telephone numbers of particular support personnel specific to an installation of the integrated system.

According to an alternate embodiment of the present invention, help processor 22 provides fully context-sensitive help based upon the cursor position at the time the user requests help. According to this embodiment, the user is provided with a portion of a help text file that is specifically addressed to the task being attempted by the user at that particular time. Fully context-sensitive help is not as fast or as easily adapted as chapter-sensitive help, but can provide for more specific information available to the user without further navigation within the help processor 22.

The operation of the integrated system is further enhanced through the use of grammar files 24 and parameter files 26 shown in FIG. 1. An important technical advantage of the integrated system of the present invention inheres in the fact that the grammar files 24 allow for user-sensitive programmability of the graphical user interface 18. In operation, a user identification is used by the integrated system to select an appropriate grammar file from which to provide the data for the fields within the screens of the graphical user interface 18. This data is taken on a field-by-field basis from one of the grammar files 24 applicable to the particular user of the integrated system. Accordingly, the fields of text that are used by the graphical user interface 18 are not hard-coded textual material, but are in fact variables that can be changed by manipulating the grammar files 24. In this manner, the graphical user interface 18 can be customized on a user-by-user basis. For example, a standard grammar file can be stored within grammar file 24 to provide for English textual material to appear within the screens of the graphical user interface 18. In addition, a foreign language equivalent of the standard grammar file can also be stored in grammar files 24 for use by users of the graphical user interface 18 fluent in that foreign language. In this manner, an English-speaking user and a Spanish-speaking user can use the identical functionality of the integrated system through graphical user interfaces which are customized to their particular language preference. In addition, the execution control processor 10 provides for editing capability of the grammar files to allow for particular installation of the integrated system to customize the grammar files to their own needs. For example, a particular financial institution might not refer to their personnel as "tellers" but might prefer the term "customer service representatives". Accordingly, the variable associated with the term "teller" within the grammar files 24 could be changed by a supervisor at that installation to "customer service representatives".

The grammar files 24 are linked through the security processor 12 to the profiles associated with particular users of the integrated system. In this manner, a user is shown the textual material within the graphical user interface 18 according to his preferences and according to his security level as monitored by the security processor 12.

The parameter files 26 provide for additional configurability for the integrated system. The parameter files 26 include values for variables associated with the operation of the integrated system that require more rigorous monitoring than those associated with the variable textual material within the grammar files 24. For example, the parameter files 26 may store fee structures, security codes, user identification codes, transaction dollar limits and printing parameters. These parameters are not fully variable in the sense that the values for the parameters must be within some defined range in order for the proper functioning of the integrated system. The execution control processor 10 and the security processor 12 cooperate to allow the editing of the parameters provided that the user attempting to do the editing has sufficient security and supervisory authority. The security associated with the parameter files 26 may comprise many levels. For example, a teller in a financial institution may not have access to any of the parameter files 26. A supervisor at the financial institution may have access to some parameters, but might not have access to identification numbers for the financial institution or for parameters which disable whole sections of the integrated system that are not implemented at that particular financial institution. In addition, the financial institution supervisor may not have access to particular dollar limits on transactions that have been imposed on that financial institution by the operator of a super server or host accounting facility.

Certain parameters within parameter files 26 can affect the operation of the graphical user interface 18. For example, a particular parameter might select a check format that requires a different set of data entry screens to be presented to the user.

The execution control processor 10 is also coupled to a print processor 28 which serves as an interface between the execution control processor 10 and a printer 30. In general, the print processor 28 operates to communicate data to be printed by the printer 30. The printer 30 serves to print the financial instruments such as money orders and official checks created and documented by the integrated system. The printer 30 also functions to print various reports associated with the operation of the integrated system. The printer 30 may comprise a laser printer that is capable of printing using a magnetic ink character recognition (MICR) font. The MICR font is used to place encoded characters on each of the financial instruments based on a standard as prescribed by the American Banking Association that can be read by magnetic character recognition systems used by the financial institution cashing the financial instrument. In addition to the ability to access a MICR font, the printer 30 has a variety of other security features to enable the secure operation of the integrated system. The printer 30 is capable of bidirectional communication through the print processor 28 to the execution control processor 10. In this manner, the printer 30 can request and receive a password from the execution control processor 10 prior to accessing the MICR font to create a financial instrument. This bidirectional communication further allows the printer to communicate error codes created during the printing process to the execution control processor 10 to allow the execution control processor 10 to establish which financial instruments have been created prior to the error condition and which have not been created prior to the error condition. These error codes may comprise, for example, data indicating that the printer is jammed, that the toner is low or out, that the printer is out of paper or off-line. The information as to exactly what has and has not been printed by the printer 30 is essential to proper accounting for the financial instrument. For example, if a series of financial instruments such as money orders are being printed and a printer jam occurs after two of them have printed, the execution control processor 10 must properly log the creation of two financial instruments and must attempt to recreate the third financial instrument. If the printer 30 were not able to communicate the error condition back to the execution control processor 10, the execution control processor 10 might assume erroneously that every item that was sent to print actually printed.

The ability of the printer 30 to access on a secure basis a MICR font allows for the creation of the financial instruments to be accomplished within the printer 30 from blank stock. The blank stock has no intrinsic value and cannot be used to fraudulently create financial instruments. As such, the blank stock need not be accounted for and secure storage of the blank stock is not necessary. As discussed previously, the use of the bidirectional communication and password-based security between the execution control processor 10 and the printer 30 through the print processor 28 prevents fraudulent use of the printer 30 to create financial instruments. If someone were to steal the printer 30, the MICR font could not be accessed because the printer 30 must receive the appropriate security signals from the integrated system prior to printing any financial instrument. According to one embodiment of the present invention, the printer 30 comprises a Hewlett-Packard Laser Jet 4 printer with the MICR font contained on a separate SIMM card within the printer. The SIMM card also may comprise a secure numeric font that is used to print the amounts on the financial instruments. This numeric font includes characters that cannot be altered to fraudulently increase the amount of a financial instrument.

The integrated system described with reference to FIG. 1 may be constructed as a stand-alone unit with all components of the system residing, for example, in a personal computer coupled to the printer 30. In the alternative, the system of the present invention may be implemented in a network environment. In this environment, various processors described may be physically located in dedicated servers. For example, the graphical user interface 18 might be located in a user node while the execution control processor 10, the grammar files 24, the parameter files 26 and the help processor 22 might be resident in a file server coupled to the user node through the network. Under this implementation, the print processor 28 and the communication processor 20 may be located in dedicated servers as well. The system of the present invention is constructed as an object-oriented integrated system to allow for portability between a variety of both stand-alone and network-based platforms.

The modular nature of the architecture of the system of the present invention allows it to be efficiently integrated into existing systems. For example, the operations of the system of the present invention used to create and manage various financial instruments can be accessed through other software user environments in place of graphical user interface 18. In this manner, the functional capabilities of the system of the present invention can be integrated into existing systems using existing user interfaces. Existing capabilities other than the user interface can also be used. For example, existing communications facilities can be accessed in place of communication processor 20 in order to efficiently integrate new functionality into existing systems. Existing communications facilities can be used to transmit consolidated data from a variety of sources to a host facility.

Figure 2:
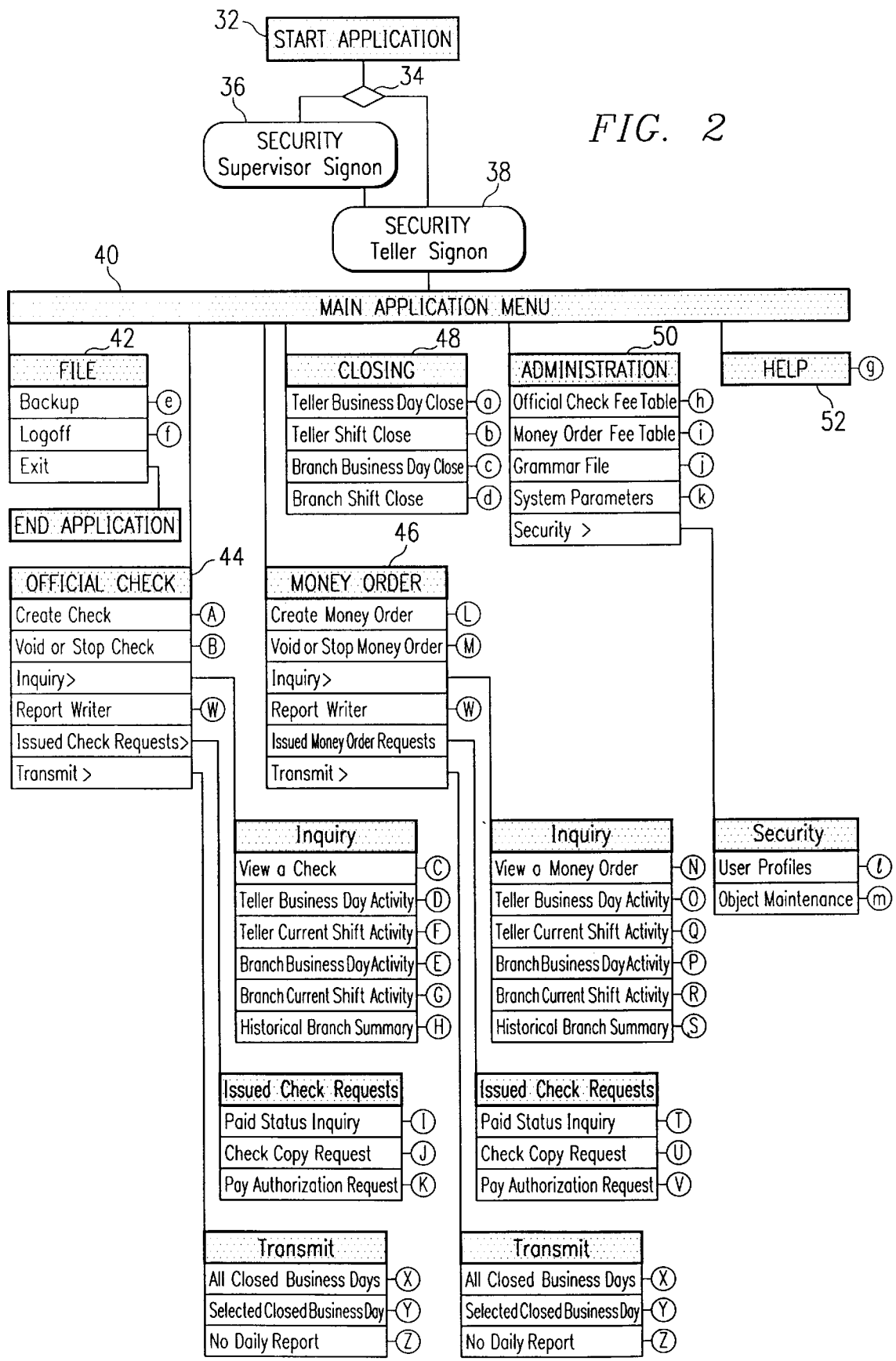

FIGS. 2 through 28 illustrate the menu options available to a user of the integrated system as well as flow charts of the processing performed by the integrated system in response to the user's commands. FIG. 2 illustrates the sign-on security measures as well as the main application menu. Referring to FIG. 2, the application begins at step 32 and proceeds to a decision point 34 where a parameter is tested in parameter files 26 to determine whether or not a supervisor security level sign-on procedure is enabled. If a supervisor sign-on is required, the method proceeds to step 36 where a supervisor sign-on operation is performed. The security sign-on step 36 requires a supervisor to enter a recognized supervisor user identification and a password in order to begin the application for any users of the integrated system. The supervisor's sign-on process can also request supervisor verification of the business day for the application. Financial institutions usually perform transactions on a business day basis. After the supervisor has successfully signed on in step 36, the system of the present invention proceeds to step 38 where the teller sign-on and security operations are performed. The method can proceed directly from decision block 34 to teller sign-on step 38 if the parameter file 26 does not require a supervisor sign-on step. The teller sign-on step requires an input user identification to match an input password associated with that teller. After the security processor 12 has successfully checked the security for the particular teller signing on, the execution control processor 10 crosslinks the grammar file associated with the particular teller into the graphical user interface 18 so that the particular teller is presented with screen field definitions taken from his/her selected grammar file. According to one embodiment of the present invention, a "time out" security function exists, where after a certain period of time expires, as defined in the parameter file, the program automatically logs off and returns to the main teller sign-on screen.

The integrated system then presents the main application menu 40 which is shown in detail in FIG. 2. The main application menu includes six sub-menus that are accessed as pull-down menus from the main application menu 40. The six sub-applications include the file sub-menu 42, the official check sub-menu 44, the money order sub-menu 46, the closing sub-menu 48, the administration sub-menu 50 and the help sub-menu 52. FIGS. 3 through 28 illustrate the sub-menu commands available to the user of the application and the flow chart representations of the steps performed by the integrated system in response to those commands.

Figure 3:
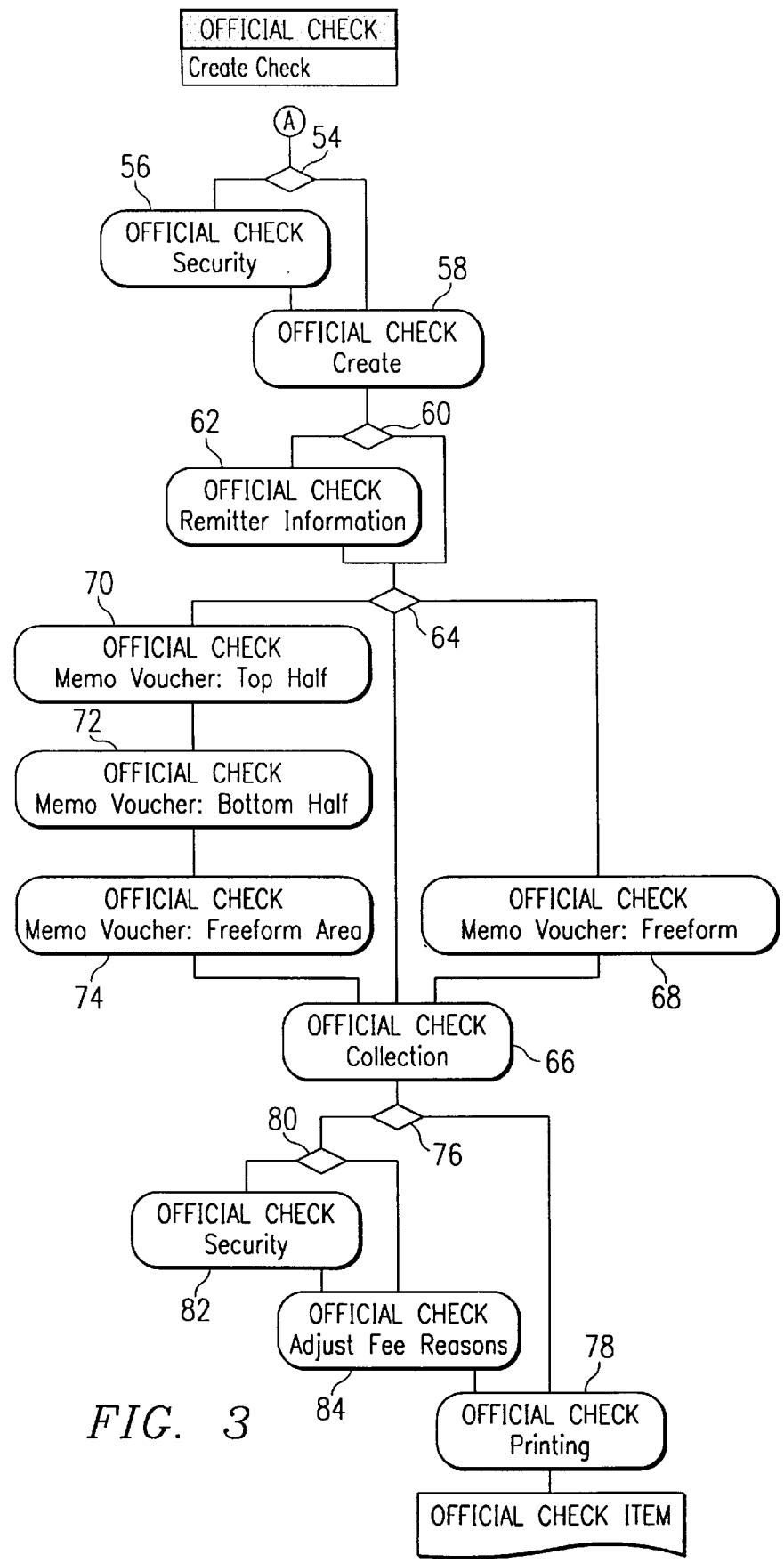

The official check sub-menu 44 allows a teller to process a financial instrument referred to as an official check. When the teller selects the official check sub-menu 44, the first option presented in the pull-down menu is the create check option. FIG. 3 is a flow-chart representation of the operations performed by the integrated system to create an official check. The method illustrated in FIG. 3 begins at branch point A and proceeds to a decision block 54 where a determination is made by execution control processor 10 whether security procedures are required prior to creating an official check. This decision is based on information stored in parameter files 26. If security information is required, the method proceeds to step 56 where the user attempting to create an official check is asked once again to sign on with their user identification and password to insure that the same person that signed onto the main application is trying to create an official check. Further, the security processor 12 can once again check the user identification to make sure that the particular teller is authorized to create official checks. The method then proceeds from step 56 or directly from step 54 to step 58 where the first of the official check creations screens is presented to the user through the graphical user interface 18. The official check requires, at a minimum, the name of the payee, the name of the remitter and the amount of the official check. The method proceeds from step 58 to a decision block 60 where a decision is made as to whether or not additional remitter information is necessary. If additional remitter information is necessary, the method proceeds to step 62 where the remitter information is gathered and input into the integrated system. An important technical advantage of the present invention inheres in the fact that the methods used to create financial instruments automatically prompt the user of the integrated system to acquire remitter information when certain predetermined dollar amounts are exceeded. Under the Bank Secrecy Act, financial institutions are required to ask for the remitter's name and other identification materials when a particular remitter attempts to get financial instruments in excess of a particular dollar amount in a particular amount of time. These guidelines can be configured into the integrated system of the present invention to prompt the teller to ask for identification and to input that identification material into the data base processor 14. Accordingly, the system of the present invention provides for an automated system to comply with the guidelines of the Bank Secrecy Act and thus eliminates human error on the part of the teller that might result in non-compliance with the Bank Secrecy Act. The checks performed in decision block 60 are comparisons to values within the parameter files 26. As such, as the guidelines of the Bank Secrecy Act are amended or as other financial institutions are required to obtain remitter information, the integrated system of the present invention can be reconfigured to comply with such changes. The graphical user interface 18 can provide specific screens to allow for the user to input the required remitter information so that the data can be captured and stored.

The parameter files 26 supply default values which are used during the creation of financial instruments to provide for default values of various fields on the financial instrument. Accordingly, the screen that is presented to the user when the user is preparing a financial instrument already has values for many of the fields. If the user chooses to edit these fields, the default value is replaced with the value entered by the user. However, the default value remains to form a complete financial instrument if the user does not edit the default value. In this manner, a particular financial institution can provide a set of defaults appropriate to that particular institution and save a teller a great deal of time in preparing financial instruments.

The method of the present invention proceeds from step 62 or directly from decision block 60 to a decision block 64 where a determination is made as to what form of official check is to be used by the system in this particular instance. The process described in FIG. 3 includes three different forms although other forms may be used by the present invention. The first form only includes the payee and the amount of the check and, as such, proceeds directly from decision block 64 to the collection block 66 with an extra copy of the check. Alternatively, the check can be of the free form variety as determined in decision block 64. The process would thus proceed from decision block 64 to block 68 where any appropriate material to be printed on the memo voucher for the official check can be input. Finally, the method may proceed from decision block 64 to block 70 where the top half of the memo voucher is completed by the teller. The method then proceeds to block 72 where the bottom half of the memo voucher associated with the official is completed. Finally, the method proceeds to step 74 where the free form area of the memo voucher associated with the official check is completed.

The method proceeds from step 74 to decision block 64 or step 68 to the official check collection block 66. In step 66, the system of the present invention uses the fee schedules within parameter files 26 to assign a standard fee associated with each amount of the official check. This standard fee is presented to the teller to obtain collection from the remitter. The method then proceeds to step 76 where a determination is made by the system or by the teller as to whether or not the standard fees may be waived or adjusted. If the standard fees may not be waived or adjusted, the method proceeds directly to step 78 where the printing of the official check takes place.

If at step 76 the waiver or adjustment of fees is allowed and requested, the method proceeds to a decision block 80 where the parameter files 26 are accessed to determine whether or not security is required prior to the waiver or adjustment of fees. If security is required, the method proceeds to step 82 where the appropriate supervisory authority must be provided before any fees can be waived or adjusted. Supervisory authority may comprise, for example, a user identification and password associated with an authorized user. The method proceeds from step 82 or directly from step 80 if no security is required to step 84 where the teller is asked to give or select a reason why the fees are being adjusted or waived. According to one embodiment of the present invention, the teller is provided with a menu of appropriate reasons to adjust or waive fees such as preferred customers or errors on the part of the financial institution. The teller then logs the reason for adjusting the fees using the menu or by inputting new reasons and inputs the amount of the adjustment. According to one embodiment of the present invention, the adjustment of fee reasons is linked into the security associated with the particular user. Accordingly, if the teller selects from a particular set of preauthorized reasons, no security is required. However, if the teller inputs a new reason or selects from a different set of reasons for waiver or adjustment of fees, then a user with supervisory authority must provide the appropriate authority to log the waiver adjustment of fees.

According to one embodiment of the present invention, each particular implementation of the system of the present invention can include suggested adjustment amounts or percentages associated with the suggested reasons presented to the teller. For example, a preferred customer might be allowed a flat rate or percentage discount on fees. If the suggested amounts of discounts were altered by the teller, further authorization would be required. An important technical advantage of the present invention inheres in the fact that the reasons for waiving and adjusting fees and the record of how much of the fee was waived or adjusted is recorded in the data base associated with data base processor 14. Accordingly, the financial institution is provided with a log of exactly how much waiver and adjustment of fees is occurring on a teller-by-teller basis. The method proceeds from step 84 or directly from step 76 to step 78 where the official check is printed.

As discussed previously, the communication between the execution control processor 10 and the printer 30 through print processor 28 is a secure communications path. According to one embodiment of the present invention, the serial number of the printer is stored in the parameter files 26. This serial number is transmitted to the printer 30 before any printing takes place or alternatively, the printer 30 may transmit the serial number to the execution control unit 10. In either case, the serial number of the printer 30 is checked against the serial number stored in the parameter files 26 to verify that the correct printer is being used. The printer then responds over the bidirectional communications path with a request for the password associated with the printer. The integrated system of the present invention must respond to the printer 30 with the appropriate password before the MICR font stored in the SIMM board within the printer 30 can be accessed. The data is then retrieved from the data within data base processor 14 and transmitted as a data stream to the printer 30 through the print processor 28. Also, as discussed previously, any error codes generated by the printer during the printing of financial instruments are transmitted back to the execution control processor 10 to allow for the accurate accounting of partially created financial instruments or transactions. The MICR font may comprise numeric characters that are difficult to alter and may further comprise the spelling for each number printed under each numeric character.

The system of the present invention allows for the printing of captured material on financial instruments. For example, company logos and signatures can be captured and stored within the system. These logos and signatures can then be printed on an item when it is created. The system can be configured to selectively include a logo and to select from different signatures depending on, for example, the amount of the financial instrument.

The serial numbers associated with particular financial instruments are generated at the time of printing and printed on the blank stock with the remainder of the information printed on the check. Accordingly, there is no need to maintain stock with serial numbers already preprinted on the stock. The blank stock used by the system of the present invention need not be stored in a secure environment because it is worthless until a serial number, a MICR code, and an amount are printed on the stock at the time of the creation of the financial instrument. In addition, logos, signatures and other information such as "fingerprint" codes can be printed on the financial instrument blank stock when the instrument is created. A "fingerprint" code comprises a character string printed with an extremely small font that may include an issue date, an issue time, a teller identification, a printer identification, a software version identification, an item serial number and an item amount. According to one embodiment of the present invention, the serial numbers associated with particular financial instruments can be self-generating in the sense that the financial institution identification number and a chronological identification of the particular financial instrument from that financial institution can be made a part of the serial number for a particular financial instrument. In this manner, processing of the financial instruments upon cashing of the financial instruments can be greatly simplified in that the serial number of the proffered financial instrument will identify the institution issuing the financial instrument. Whatever method is used to create or assign serial numbers, the serial numbers are not assigned to the financial instrument and the data base associated with data base processor 14 is not updated until printing of the financial instrument actually occurs. The contemporaneous creation of the financial instrument and the creation of the record within the data base prevents erroneous records from being created and changed within the data base.

Figure 4:
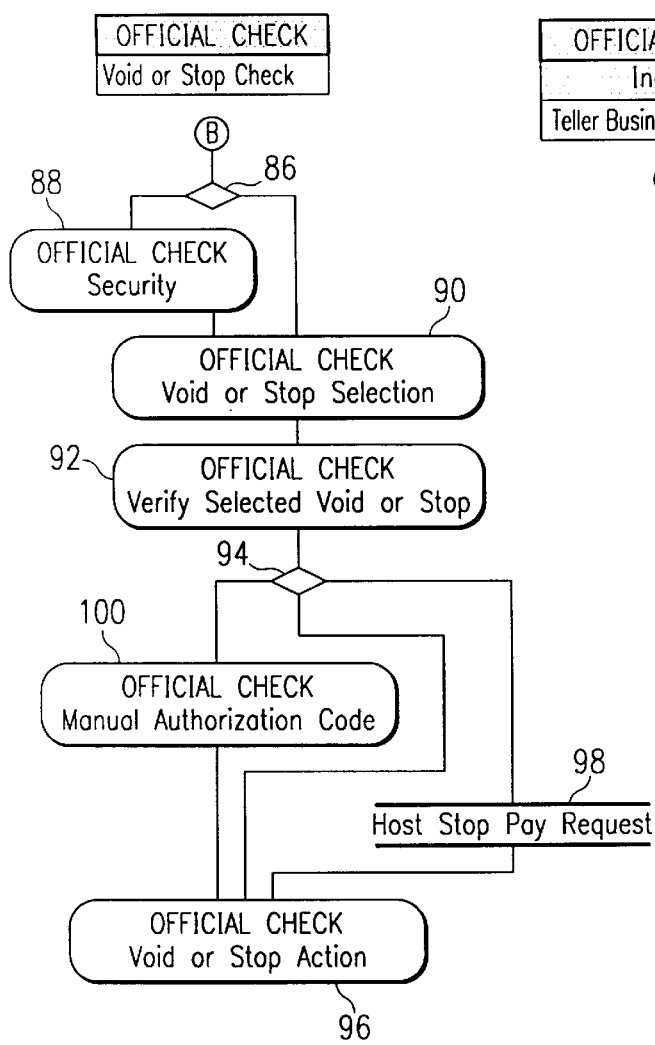

FIG. 4 illustrates the method used by the system of the present invention when the user of the system selects the void or stop check selection from the official check sub-menu 44. The method proceeds from branch point B to a decision block 86 where a decision is made based on a parameter value within parameter files 26 as to whether or not security is required before a void or stop check function is performed. If security is required, the method proceeds to step 88 where a variety of security methods may be implemented. For example, the teller may be required to reenter his/her user identification and his password to be sure the teller who logged on to the terminal is requesting the void or stop check operation. Similarly, supervisory authority may be required to do a void or stop check operation. As such, a supervisor user identification and password may be required in step 88. The method proceeds from step 88 or directly from step 86 if no security is required to step 90 where the void or stop selection screen is presented to the user. The user inputs three basic pieces of information to the system. The user inputs a check number, a check amount, and an indication as to whether or not the party requesting the void or stop check has the check in hand. If the check to be voided is in hand, the teller can retrieve the check and a stop payment is not required. If the check is not in hand, a stop payment is required. The method proceeds from step 90 to step 92 where the information input by the teller is displayed for verification. The teller can cancel the operation. The data base is accessed prior to step 92 to match the check number with the appropriate check amount.

The void or stop check operation is different depending upon whether or not the financial instrument to be voided was issued on the same business day or a previous business day. If the financial instrument was issued on the same business day, the transaction can be retrieved from the data base and zeroed out to completely correct the accounts associated with the transaction. However, if the financial instrument was issued on a prior business day, a corrective transaction must be entered in the current business day in order to bring all accounts into balance. It is not proper in normal operations of financial institutions to access a transaction from a prior business day and change the transaction data. This is due to the fact that transactions are customarily recorded and financially balanced on a business day by business day basis. Accordingly, a countering transaction must be entered in a later business day to adjust the accounts into balance.

Referring to FIG. 4, the method proceeds to a decision block 94 where a determination is made as to whether or not a stop payment is required and if a stop payment is required, whether or not the particular implementation of the system enjoys the ability to do automatic stop payments using the communications processor 20 and network communications facilities as specified in parameter files 26. If no stop payment is required, the method proceeds directly to step 96 where the transaction is either voided from the current business day or a countering transaction is entered in the current business day. If the system enjoys the capability to perform automated stop payments, the method proceeds to step 98 where a host stop pay request is performed by establishing contact with the host through communications processor 20 and the network connections discussed previously. In this manner, the host will log the stop pay request and prevent cashing of the check when the check is presented to any financial institution associated with the host system. If at decision block 94 the automated stop payment operation is not available at the particular time or is not available to that system, the method of the present invention proceeds to step 100 where the teller is prompted to perform a manual stop payment request by manually calling personnel associated with the host computer to obtain authorization and log the stop payment. After the stop payment authorization code is received back in the manual transaction, the authorization code is entered into the system and the method proceeds to step 96 where the stop payment action is logged and the voiding transaction is recorded.

An important technical advantage of the present invention inheres in the fact that all communications with the host system through the communication processor 20 also involve security procedures. For example, a particular financial branch contacting the host system through the communications processor 20 and network connections can only access information relative to that branch. For example, in the process described previously, if a branch were to attempt to do a stop payment on a check that was not issued by that financial institution, the host would transmit information to the system through the communications processor 20 which would disallow the transaction. This type of security is used whenever a particular system at a financial institution communicates with the host system. For example, as will be described herein, financial institutions will sometimes make inquiries about transactions or financial instruments to the host system. The host computer utilizes security routines to prevent a party from calling in and acquiring about any information on a financial instrument not issued by that financial institution.

Figure 5:
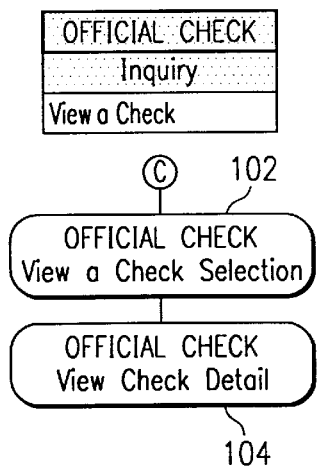

FIGS. 5, 6, 7 and 8 relate to the operations performed under the official check sub-menu 44 and the inquiry sub-menu within the official check sub-menu 44. Referring to FIG. 5, the view a check option causes the application to branch from branch point C to a step 102 where an information gathering screen is presented to the user through the graphical user interface 18. The user inputs the check serial number. The method then proceeds to step 104 where the execution control processor 10 retrieves the detail data from the data base associated with data base processor 14 and displays the check detail through the graphical user interface 18.

The inquiry functions do not require communication outside of the integrated system. The inquiry functions are merely accessing information stored in the data base associated with data base processor 14. The user has the capability to configure the amount of data that is maintained by the data base processor 14 using the parameter files 26. For example, a user may choose to maintain a single business day's, a single business week's, or a single business month's worth of data even after such data is uploaded to a host system. This data is maintained largely for the purposes of making inquiries such as those described with reference to the inquiry sub-menu under the official check sub-menu 44. The view a check process described with reference to FIG. 5 previously will often be used by a teller prior to entering the void or stop check process described with reference to FIG. 4 to insure that the check is a check that is accessible by the particular user.

Figure 6:
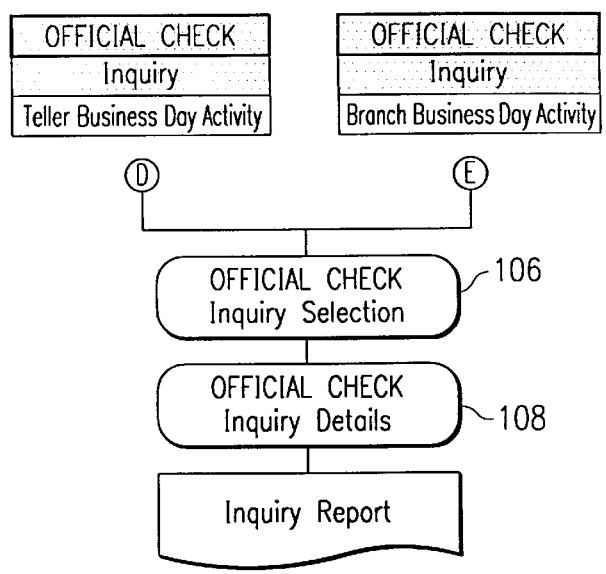

FIG. 6 illustrates the operations performed by the system in performing the teller business day activity and the branch business day activity functions under the inquiry sub-menu. Both of these processes proceed to a step 106 where the particular inquiry business day is selected by the user. Upon receiving the appropriate inquiry, the system presents the user in step 108 with the sequential detail of all transactions entered by the teller or by the branch depending upon the selection made in step 106. The user is presented with an option in step 108 to print a report which includes the detail presented in step 108.

Figure 7:
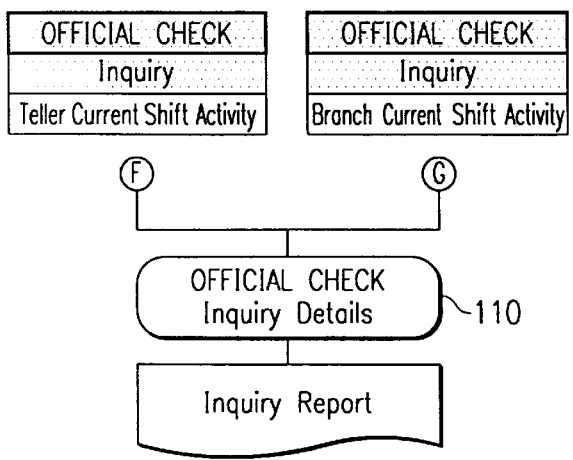

Similarly, FIG. 7 illustrates the operation of the system of the present invention in performing the teller current shift activity operation and the branch current shift activity operation under the inquiry sub-menu. When either of these items are selected, the method proceeds to step 110 where the details of each transaction recorded by the teller during the current shift or the branch during the current shift are presented through the graphical user interface 18. The user is presented with the option of once again printing a report of the detail presented.

Figure 8:
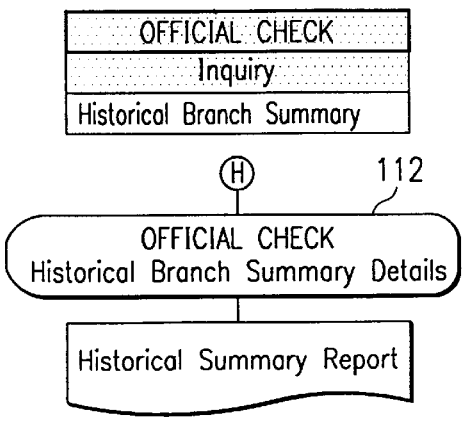

FIG. 8 illustrates the operations performed by the system of the present invention to present historical branch summary data. When this function is selected under the inquiry sub-menu, the method proceeds to step 112 where the historical branch summary totals by business day are presented. Once again, the user is given the option of printing a historical summary report. The user identification requesting the particular activities may be checked by the security processor 12 for some of the functions described. For example, the branch business day activity and the branch current shift activity may require supervisory identification before access is allowed to such data. In order to perform the security checks, the security processor 12 accesses the profile of the user signed on at that particular time to determine whether that user has access to the various functions requested. If the user does not have access to that function, a security violation message is displayed for the user and the requested functions are not performed.

Figure 9:
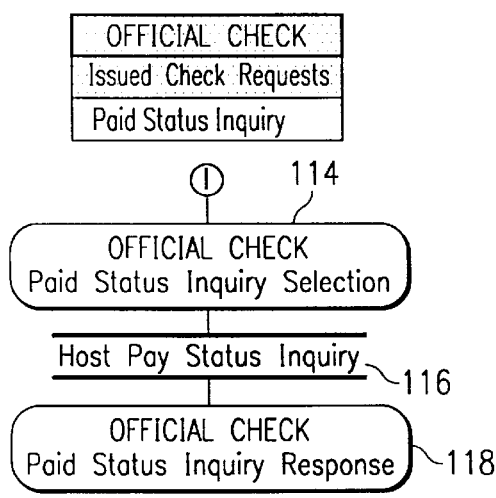

FIG. 9 illustrates the operations performed by the system of the present invention in order to do a paid status inquiry operation under the issued check request section of the official check sub-menu 44. Once the paid status inquiry is selected, the method proceeds to step 114 where the user is presented with an inquiry screen and inputs the item number which may comprise, for example, the check serial number for an official check. The system of the present invention then uses this serial number to access the data files of the host computer through the communications processor 20 and network connections as described in step 116. The host computer returns all information associated with the particular item and in step 118, and the information is displayed to the user. Typically, the user is performing the paid status inquiry to determine if a particular financial instrument has been paid or is authorized for payment. If a financial instrument has been paid, a stop check or void cannot be performed on that particular financial instrument. Typically, a teller will perform a paid status inquiry function before attempting the void or stop check function described with reference to FIG. 4 previously.

Figure 10:
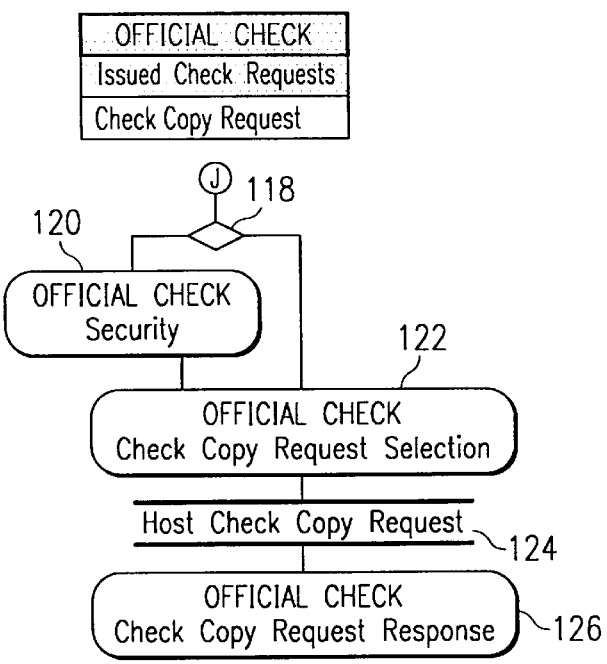

FIG. 10 illustrates the operations performed by the system of the present invention to perform a check copy request operation under the issued check request sub-menu of the official check sub-menu 44. Once the check copy request operation is selected, the method proceeds to a branch point 118 where a determination is made using the parameter files 26 as to whether or not security is required to perform a check copy request. In general, the check copy request is an automated method that a financial institution can use to log a request for a copy of a financial instrument that has already cleared and is being held by a supervisory accounting service operating the host computer to which the financial institution is connected. According to one embodiment of the present invention, cleared items are captured optically and maintained in a host-based imaging system. When a check copy request is received, the optical image is retrieved from the host and transmitted via facsimile or modem to the local system where the cleared item is printed using printer 30. The security step performed in step 120 shown in FIG. 10 may be necessary because the check copy request operation is usually associated with a fee to the financial institution. As such, only certain authorized personnel may be allowed to perform the check copy request function. Once the security checks have been performed in step 120 or directly from step 118, the method proceeds to step 122 where the item number is retrieved from the user. The method then proceeds to step 124 where a connection is made through the communications processor 20 and the network connections described previously to the host computer. The host computer will then log a request for a copy of the particular item and the staff associated with the host computer will make the physical copy and mail it to the financial institution. The host computer returns an acknowledgment of the logged check copy request to the system of the present invention through the communications processor 20. This response is displayed to the user in step 126.

Figure 11:
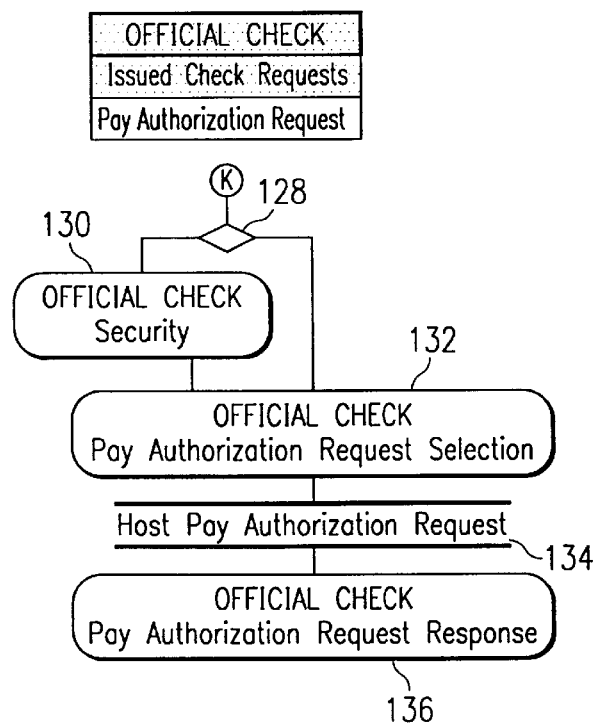

FIG. 11 illustrates the operations performed by the system of the present invention to perform the pay authorization request function under the issued check request section of the official check sub-menu 44. The pay authorization request is essentially the opposite of a stop payment request. When a financial institution is presented with a financial instrument to be cashed, the financial institution can contact the host computer to receive an authorization for cashing an item. The method begins when the pay authorization request is selected and proceeds to a decision block 128 where a determination is made by accessing the parameter files 26 as to whether or not a security check is required prior to making a pay authorization request. If a security check is required, the security check is performed in step 130 using the methods described previously. The method proceeds from step 130 or directly from step 128 to step 132 where the identification information from the financial instrument is input into the system of the present invention. This can include the serial number of an official check and the amount of the check or other information specifically identifying the particular financial instrument. Once the information is received from the user, the system of the present invention establishes contact in step 134 with the host system through the communications processor 20 and the network connections as described previously in step 134. The host system then checks to see if any stop payments have been issued for that financial instrument. If no stop payments are issued and no other irregularities exist related to the financial instrument, the host system will return an authorization to the system of the present invention which is displayed for the user in step 136.

FIG. 12 illustrates the operations performed by the system of the present invention when the report writer facility is selected under the official check sub-menu 44 or the money order sub-menu 46. The operation continues from a branch point W to a report selection step 140 where the user is presented through the graphical user interface 18 with a selection screen. The user is presented with a list of formatted reports that may be compiled from the information stored in the data base associated with data base processor 14. The user has the option of running any of the formatted reports in the background or to view, print or export reports that have already been run. If the user selects to view a report, the method proceeds to step 142 where the detail data from the report is presented to the user through the graphical user interface 18. If the user elects to print a report that has already been run, the method proceeds to step 144 where the report data is formatted and output to the printer 30 through print processor 28. The user also has the option to proceed from step 140 to step 146 where the print data is exported as a data file. In step 146, the user is asked in what format the data should be placed and what file name the data should be assigned. The data may be formatted, for example, as an ASCII delimited or ASCII fixed data file. In step 140, the user also has the option to define new customized reports or modify existing report definitions. If the user selects this option, the user proceeds to step 148 which asks the user to input the header for the report. The header for the report is a general description of the data to be presented in the report. The method then proceeds to step 150 where all the fields that are available to the user are presented. The user then selects which fields are to be included in the report. The method then proceeds to step 152 where the user specifies the sort order, selection criteria, and other field definition selections for the particular report being configured. For example, the user can elect to sort on a particular field and select only data records having a field value within particular range of values.

Using the reporting capabilities and fee management systems of the present invention, financial institutions can compile fee management reports that present detailed information as to the amounts of fees collected by the institution and particular personnel and, specifically, the amount of adjustments to fees and associated reasons for adjustments made by various personnel. In addition, the reporting capability of the present invention can be used to automatically create reports comprised of the information required of the Bank Secrecy Act. The system of the present invention, as discussed previously, can automatically prompt the teller to gather the remitter information required to comply with the Bank Secrecy Act and automatically generate a report of such information contemporaneously with the transaction.

FIGS. 13, 14 and 15 relate to the transmit function under the official check sub-menu 44 and the money order sub-menu 46. The transmit functions are largely a back-up to the automated transmissions used by the system of the present invention to contact the host system through the communication processor 20 and the network connections as described previously. The transmit functions described with reference to FIGS. 13, 14 and 15 are manual transmissions which are used if the automatic transmission of data to the host does not occur for some reason. For example, FIG. 13 illustrates the transmission of all transactions which are closed but not yet transmitted. The method proceeds from branch point X to a step 154 where the system of the present invention polls the data base associated with data base processor 14 and selects all transactions which have been closed but which have not yet been successfully transmitted to the host system through the communications processor 20. The method then proceeds from step 154 to step 156 where a communications path is established through the communications processor 20 and the network connections as described previously to the host system. Once a communications path has been established, all the selected transactions are transmitted to the host system and the transactions are flagged within the data base associated with data base processor 14 as being successfully transmitted.

FIG. 14 illustrates a similar operation as that described with reference FIG. 13 for a selected closed business day. The method proceeds from branch point Y to a step 158 where the user is asked to specify a particular closed business day to transmit. The method then proceeds to step 160 where the records associated with that business day are selected. This function can be used for original transmission of data or for the transmission of data that had already been transmitted previously. The method then proceeds to step 162 where the selected records are transmitted to the host using the method described previously with reference to FIG. 13.

FIG. 15 represents the process used by the system of the present invention to make a test transmission to the host system. The method proceeds from branch point Z to a step 164 where the user confirms that the test transmission is to take place. The method then proceeds to step 166 where a communications path is established with the host computer in order to verify that the communications processor 20, the network connections, and the communications facilities associated with the host computer are all functioning properly.

It should be understood that under ordinary circumstances, the system of the present invention will automatically transmit all closed transactions to the host computer on a periodic basis. For example, the configuration files stored within the parameter files 26 can establish a time during off hours where an automatic connection with the host system is made via the communication processor 20 and the network connections. Once this connection is made, the system of the present invention will automatically upload all of the closed transactions to the host system that have not yet been successfully transmitted.

Referring again to FIG. 2, the money order sub-menu provides identical options as the official check sub-menu 44 for the creation and processing of money orders. The screens presented to the user through the graphical user interface 18 and the operations performed by the execution control processor 10 are substantially identical to those described previously with reference to the official check sub-menu 44 and the operations accessible thereunder. The primary substantive difference between the money order financial instrument and the official check financial instrument is that a money order traditionally has a much smaller maximum value and, as such, the system of the present invention allows for the automatic or manual creation of multiple money orders in a single transaction. For example, if the maximum dollar amount for a money order was $500.00 and a customer requested money orders in the amount of $700.00, the system of the present invention would automatically create a $500.00 money order and a $200.00 money order to complete a single transaction. In addition, the system of the present invention allows for a teller to create many different money orders to different payees using the same screen before printing any of the money orders. Each of the money orders created can be edited before the entire batch of money orders is sent to print through the print processor 28 to the printer 30.

The creation of multiple financial instruments at one time requires that the system of the present invention monitor closely the printing of the multiple financial instruments in the event of printer malfunction. For example, if four money orders are sequentially processed from a single transaction and the printer runs out of paper or is jammed in the middle of printing the four money orders, the system of the present invention must receive exact information as to which, if any, of the money orders were printed prior to the printer running out of paper or entering the jammed condition. As discussed previously, the system of the present invention enjoys bidirectional communication with the printer 30 through the print processor 28. As such, the specific error messages retrieved from the printer 30 can be used to automatically account for which financial instruments have been printed and which must be retried. Accordingly, if multiple money orders are being printed and an error condition occurs during the printing, the money orders that have been printed will be logged as completed transactions and the system of the present invention will automatically prompt the user with the error condition associated with a particular incident and will ask the user if they want to retry printing the remaining money orders.

The remaining functionality shown in FIG. 2 under money order sub-menu 46 is performed identically to those described with reference to the functionality described under the official check sub-menu 44.

Figure 16:
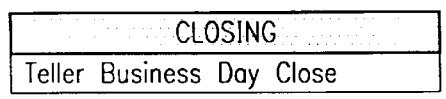
Figure 17:
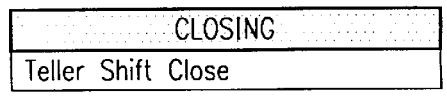

FIGS. 16 through 19 involve the operations performed by the system of the present invention under the closing sub-menu 48. In general, the closing operation can be performed by the system of the present invention in two ways. The system of the present invention utilizes an automatic close operation that is performed periodically to insure that a financial institution does not skip a business day. However, the typical closing operation will be performed in response to an operation specified using the graphical user interface 18 under the closing sub-menu 48. FIG. 16 represents the operations performed for a teller business day close operation. The method of the present invention begins at branch point a and proceeds to a step 170 where the teller confirms the closing of the current business day and confirms the date of the next business day as predetermined. All transactions for the teller's closed business day are then printed in a close report at step 172. When the first teller closes for a given business day, a supervisor approval is required to establish the new business day; subsequent teller and business day closes for the same day may not require confirmation of the new business day. All transactions entered by that teller after the close operation will then be entered on the next business day entered by the teller. FIG. 17 illustrates the teller shift close operation. The method of the present invention begins at branch point b and proceeds to a step 174 where the teller confirms a shift close. A number of shifts can occur during the business day. The teller shift close operation allows for a teller to prepare periodic reports during a business day without affecting the business day to which the transactions before and after the report are logged. The method proceeds from step 174 to step 176 where a teller shift close report is printed with the transactions for that teller shift.

Figure 18:
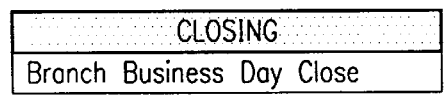

FIG. 18 illustrates the operations performed by the system of the present invention to perform the branch business day close operation. The method of the present invention begins at branch point c and proceeds to step 178 where someone with supervisory authority and security clearance confirms the branch business day close operation. The method then proceeds to step 180 where a branch business day close report is prepared. The branch business day close operation is similar to the teller business day close operation except it closes all teller accounts simultaneously for the branch. Branch-close operations and teller-close operations can be mixed. For example, a branch-close operation can be used to close all the remaining open tellers, and to produce a close report for the entire branch.

Figure 19:
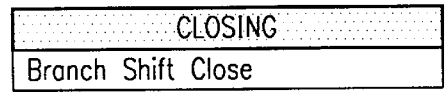

Similarly, FIG. 19 represents the branch shift close operation. The method of the present invention proceeds from branch point d to step 182 where someone with supervisory authority and security clearance confirms the branch shift close operation. The method then proceeds to step 184 where a branch shift close report is printed. The branch shift close operation is similar to the teller shift close operation except that the branch shift close operation simultaneously prepares an interim report for all tellers within the branch.

According to one embodiment of the present invention, the security processor 12 requires security checks during the closing operations. For example, as described previously, the branch closing operation illustrated with reference to FIGS. 18 and 19 may require supervisory authority prior to performing these operations. Further, supervisory authority may be required in specifying the next business day for a teller or a branch in order to prevent errors in establishing the next business day applicable to the financial institution.

An important technical advantage of the present invention inheres in its flexibility in separating business days and actual days during the preparation of financial instruments. For example, the ability to selectively close particular tellers' business days without affecting the operation of the preparation of financial instruments allows the system of the present invention to efficiently distribute financial instruments that are dated with the actual date regardless of the business day to which those financial instruments are attributed. Further, the ability to close particular tellers or to close an entire branch allows for flexibility in the operation of a particular financial institution or retail establishment. In large financial institutions, the closing operation can be very complex in that it requires supervision on a teller-by-teller basis. The flexibility of the software system of the present invention allows for the supervision of closings to occur without affecting the operation and distribution of financial instruments from remaining tellers in the branch.

Figure 20:
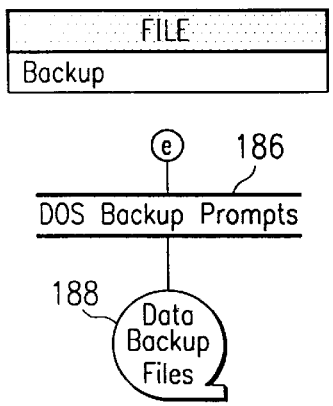

FIG. 20 represents the operations performed by the system of the present invention when the back-up utility is invoked under the file sub-menu 42. When the back-up utility is invoked, the method proceeds from branch point e to step 186 where the conventional DOS-based back-up utilities are invoked to create conventional data back-up files of all updatable files at step 188. These files may comprise, for example, the transaction files, grammar files, parameter files, and help files.

Figure 21:
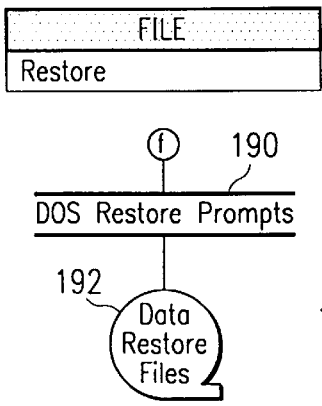

Similarly, FIG. 21 represents the operations performed by the system of the present invention when the restore operation is chosen from the file sub-menu 42. The method of the present invention follows from branch point f to step 190 where the conventional DOS restore utilities are invoked. The method follows the DOS restore operations to retrieve data from the DOS back-up files and to create the restored files at step 192.

Submenu 42 also includes the "logoff" and "exit" functions. When invoked, the logoff function returns the teller to the teller sign-on step 38 described previously. The exit function terminates the application.

Figure 22:
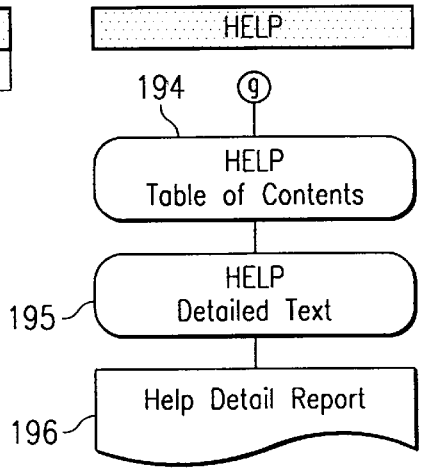

FIG. 22 illustrates the operations performed by the system of the present invention when the help sub-menu 52 is invoked by the user. The method proceeds from branch point g to a step 194 where the table of contents for the help file is displayed to the user. The user can then navigate through the table of contents to a particular chapter and the method will proceed to step 196 where the detailed text for that particular chapter is displayed. The user has the option with a displayed chapter to print the detailed text at step 196. As described previously, the help utility may be invoked by a user during operations outside of the context of the main application menu 40. In these contexts, the help is context-sensitive at the chapter level. In other words, a user that is practicing a particular operation performed by the system of the present invention will be directed to the chapter associated with that operation. FIG. 22 illustrates the invocation of the help utility from the main application menu where the table of contents is first presented to the user in step 194. Also, similarly, as was described with reference to grammar files 24, the help file presented to the user may be cross-linked with the user identification. Accordingly, user's help is configurable to the particular user's need. This may be used to provide foreign language help to user's fluent in that foreign language. In addition, the particular help file may be customized to fit a particular installation. For example, a particular teller installation might be directed using the help file to contact a direct supervisor in certain circumstances. Neighboring tellers might be directed to contact different supervisors under the same circumstances.

FIGS. 23 through 28 illustrate the operations performed by the system of the present invention under the administration sub-menu 50. In general, the administration sub-menu 50 will be closely guarded by the security processor 12 due to the nature of the operations performed therein. In general, the administration sub-menu 50 deals with alterations to parametric values that are used during the operation of the system of the present invention. As such, supervisory authority is usually required to adjust any of the values. Further, many of the values changed through the administration sub-menu 50 must be within ranges or be values of a particular nature such as numeric values in order for the system of the present invention to operate properly. As such, the operations performed under the administration sub-menu 50 in many circumstances contain field-by-field checks to make sure that the values entered by the person adjusting the parametric values have entered appropriate values.

FIG. 23 illustrates the method used by the present invention to adjust the official check fee table. The official check fee table is stored within parameter files 26 and is accessed in step 198 by a user with suitable supervisory authority. The official check fee table is a table of dollar amount ranges and a fee associated with that range. Both the ranges and the fee for that range can be adjusted by the user.

FIG. 24 illustrates the operation performed by the system of the present invention to adjust the money order fee table. The money order fee table is virtually identical to the official check fee table and is adjusted at step 200 by a user with similar supervisory authority.

Although the present invention has been described with fee tables and fee management functions associated with the creation of financial instruments, it should be understood that similar functionality may be associated with other chargeable activities. For example, similar fee management routines can be used for fees associated with stop payment requests and check copy requests.

FIG. 25 illustrates the operations used by a user of the present invention to edit a particular grammar file stored in grammar files 24. Once the grammar file operation is invoked under the administration sub-menu 50, the method proceeds from branch point j to a step 202 where grammar file items are listed and selected to be edited. The method then proceeds to a step 204 where the selected item in the grammar file is displayed for the user and the user can change the textual material displayed for the item within the grammar file. As discussed previously, the grammar file includes variable identifications for the various fields within the screens of the graphical user interface 18. The system of the present invention can be configured and customized for a particular user's needs by changing the contents of a particular grammar file. The grammar file to be used with a particular user is cross-linked with the user's identification so that a particular grammar file and the graphical user interface 18 are cross-linked at the time the user logs on. In this manner, the system of the present invention can be customized to a particular user's needs without necessity of hard-coding the various screens within the graphical user interface 18.

Similarly, FIG. 26 represents the steps used by the system of the present invention to alter the system parameters stored within parameter files 26. Once the system parameters operation is selected under the administration sub-menu 50, the method proceeds from branch point k to a step 206 where system parameter file items are listed and selected to be edited. The method then proceeds to step 208 where the selected system parameter within the parameter file is displayed for the user and may be edited by the user. The security processor 12 closely monitors the editing process to insure that the values input by the user fall within any necessary ranges for the system parameters. For example, a system parameter might be associated with the time in which the automated upload process is performed on a daily basis. The security processor 12 will insure that the value input by the user with the appropriate security is a valid time. Further, as discussed previously, the system parameter values may be subdivided into those accessible to day-to-day users, the system administrator and persons servicing the software. A day-to-day user may have particular system parameters available to him/her such as those associated with display colors and other hardware configuration parameters. A system administrator might be able to change the time for the automated caller proceeding or other global parameters associated with the operation of the financial institution site and the persons servicing the software might be the only users allowed to change the serial number associated with the financial institution or the telephone number to be called for the automated call-up. The security processor 12 monitors the access requested and will allow the parameters to only be edited by persons having the required security level.

According to one embodiment of the present invention, the parameters stored in parameter files 26 may be accessed and edited remotely through the network connections and communications processor 20. The access to the parameter files 26 from a remote host is also managed by security processor 12. In this manner, the system of the present invention can be remotely maintained and configured using a remote host system.

FIGS. 27 and 28 illustrate the operations performed under the security sub-heading under the administration sub-menu 50. In general, the security operations are only accessible to a system administrator in that they generally deal with the ability of particular users to access various capabilities of the system. The security user definition and object maintenance operations provide information to the security processor 12 as to what particular objects are available to what particular users.

FIG. 27 illustrates the operations performed by the system of the present invention to define new user profiles and to edit existing user profiles. The method proceeds from branch point 1 to a step 210 where a particular user profile is selected from a list of existing users. The user also has the option to add a new user. If the user makes such a selection, the method proceeds to step 212 where the new user identification is received from the user and the user may copy an existing user profile for the new user. The method proceeds directly from step 210 or from 212 to step 214 where the user profile is defined and a password for the new user is requested and confirmed. The method then proceeds to step 216 where the objects are listed for a particular user. The method then proceeds to step 218 where the tables that store the authorization for each object for a particular user is updated. A user profile comprises information identifying the user; his password; his authority designation of teller, supervisor, branch manager, or administrator; a help file designation; a grammar file designation; specific user parameters; and object authority security. The levels of object authority comprise no authority, read, write authority, change authority, delete authority, and existence authority. In general, the security associated with security processor 12 of the present invention is a hierarchical object-oriented security. The security processor 12 keeps track of a list of users and a list of objects which may comprise screens, programs, files, reports or particular fields within screens. The security processor 12 monitors the requested access of a particular user using the table of objects which are authorized to be accessed by that user. The user definition operation illustrated with reference to FIG. 27 allows an administrator of a system to preclude a whole program and all the objects associated with that program from access by a particular user. In addition, the user can access the security of particular objects in a hierarchical fashion and preclude particular screens or particular fields within screens from access for users.

FIG. 28 represents the object maintenance operation performed under the administration sub-menu 50. The method proceeds from branch point m to a step 220 where all of the objects are listed and the user is presented with several options. The system administrator can proceed to step 222 where particular users can be authorized access to a particular object. The method then proceeds to step 224 where the tables described previously are updated with the new user authorization information. From step 220, the system administrator can also add a new object to the object list in step 226. If a new object is added, the method proceeds to step 228 where the new object is described. The method can also proceed directly from step 222 to step 228 if an existing object description must be edited. One type of object that is added to the object list is new reports formatted using the report writer capability described previously. The report writer program automatically adds any newly formatted reports to the object list. The system administrator can then authorize new users to access that report in step 222 and step 224 described previously.

The data processing system described herein integrates a sophisticated graphical user interface 18 with an object level security processor 12. In addition, sophisticated bidirectional communication with a printer 30 is utilized to provide for the efficient and secure printing of financial instruments. The operation and maintenance of the integrated system is enhanced through the use of grammar files and parametric-based files to allow for easy configuration and customization of the integrated system.

Although the present invention has been described in detail, it should be understood that various changes, alterations and substitutions can be made to the description of the system described herein without departing from the spirit and scope of the invention which is solely defined by the appended claims.

What is claimed is:

1. A printing system operable to print a financial instrument, comprising:

a data base for storing information associated with the financial instrument;

a printer operable to print financial instruments, and being responsive to data received from the data base, said printer operable to use a magnetic ink character recognition font for printing at least portions of the financial instrument; and a security processor operable to compare a unique identifier associated with the printer, to a stored identifier to confirm the identity of the printer and operable to automatically transmit to the printer, in response to confirming the identity of the printer, a password associated with the printer to gain access to the printer for printing the financial instrument after the password is confirmed.

2. The printing system of claim 1, wherein said security processor is operable to require confirmation of an identity of a user of the printer prior to allowing access to the printer.

3. The printing system of claim 2, further including a plurality of levels of user identities, where different levels of identities allow different uses of the printer.

4. The printing system of claim 1, wherein said printer is operable to be loaded with paper stock having no intrinsic economic value, and when printed by said printer, the resulting printed paper has an intrinsic economic value.

5. The printing system of claim 4, wherein said printer is operable to print official checks and money orders from said paper stock.

6. The printing system of claim 1, wherein said font is stored in a memory in said printer.

7. The printing system of claim 1, wherein the printer is operable to use said magnetic ink character recognition font to print selected characters on the financial instrument, and wherein the printer must receive the password associated with the particular printer prior to accessing the magnetic ink character recognition font.

8. The printing system of claim 1, further comprising a fee calculation system operable to calculate fees associated with the financial instruments processed by the system, the security processor being operable to monitor the processing of fees such that authorization and documentation is required before the calculated fees can be waived or adjusted.

9. The printing system of claim 1, wherein said printing system processes a financial instrument selected from a group consisting of official checks, money orders, money grams, starter checks, variable amount coupons, gift checks, gift certificates, cashier checks, instapay functions and phone cards.

10. The printing system of claim 1, further including a memory storing printed matter to be printed on the paper stock, whereby said paper stock only has intrinsic economic value once printing is applied thereto.

11. A method for controlling a printer to print a financial instrument, comprising the steps of:

receiving and storing information associated with the financial instrument;

comparing a unique identifier associated with the printer to a stored identifier to confirm an identity of the printer;

automatically transmitting, in response to confirming the identity of the printer, a security code associated with the printer to the printer to access a secure font; and printing the financial instrument using the secure font and the information associated with the financial instrument.

12. The method of claim 11, further including storing the secure font in a memory in said printer.

13. The method of claim 11, further including loading the printer with blank stock of the type having no intrinsic economic value.

14. The method of claim 13, further including storing the information to be printed in a memory.

15. A printing system operable to print a financial instrument, comprising:

a data base for storing information associated with the financial instrument;

a printer operable to print financial instruments, and being responsive to data received from the data base; and a security processor operable to compare a unique identifier associated with the printer, to a stored identifier to confirm the identity of the printer and operable to automatically transmit to the printer, in response to confirming the identity of the printer, a password associated with the printer to gain access to the printer for printing the financial instrument after the password is confirmed.

16. A printing system operable to print a document having intrinsic economic value, comprising:

a data base for storing information associated with the document;

a printer operable to print the documents, and being responsive to data received from the data base; and a security processor operable to compare a unique identifier associated with the printer, to a stored identifier to confirm the identity of the printer and operable to automatically transmit to the printer, in response to confirming the identity of the printer, a password associated with the printer to gain access to the printer for printing the document after the password is confirmed.

17. A method for controlling a printer to print a document having intrinsic economic value, comprising the steps of:

receiving and storing information associated with the document;

comparing a unique identifier associated with the printer to a stored identifier to confirm an identity of the printer;

automatically transmitting, in response to confirming the identify of the printer, a security code associated with the printer to the printer to access a secure font; and printing the document using the secure font and the information associated with the document.

* * * * *